United States Patent Office 3,767,694
Patented Oct. 23, 1973

3,767,694
ADAMANTANE CARBOXYLIC ACID ESTERS OF CHLORAMPHENICOL
Venkatachala L. Narayanan, Hightstown, and Rudiger D. Haugwitz, Highland Park, N.J., assignors to E. R. Squibb & Sons, Inc., New York, N.Y.
No Drawing. Filed Jan. 6, 1971, Ser. No. 104,471
Int. Cl. C07c 69/74, 69/76
U.S. Cl. 260—468 G
9 Claims

ABSTRACT OF THE DISCLOSURE

Adamantane carboxylic acid esters of chloramphenicol are provided which are useful as anti-bacterial agents.

---

The present invention relates to adamantane carboxylic acid esters of chloramphenicol having the structure

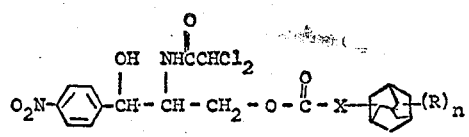

wherein X is a single bond or alkylene or alkenylene, and can be attached at the 1 or 2 position of the adamantane ring, R can be halogen, lower alkyl, lower alkoxy or phenyl, and $n$ is 0, 1 or 2.

X represents a straight or branched chain bivalent aliphatic hydrocarbon group, namely, an alkylene group or an alkenylene group having from one to about six carbon atoms in the linking chain, such as methylene, ethylene, propylene, butylene, dimethylethylene, 1-propylbutylene, 1,2-diisopropylpentylene, 1-ethyl-2-butylhexylene as well as any of the above including a double bond in the linking chain such as ethenylene, 1-propenylene, and 2-butenylene and the like.

The term "lower alkyl" as employed herein includes both straight and branched chain radicals of up to eight carbon atoms, for instance, methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, and the like.

The term "halogen" includes F, Br, Cl or I.

The term "lower alkoxy" includes straight and branched chain radicals which correspond to the above lower alkyl groups attached to an oxygen atom.

Preferred are those compounds wherein X is a single bond, R is H, and the adamantyl ring is joined at the 1-position.

From the following description it will be apparent to those skilled in the art that the 1-p-nitrophenyl-2-dichloroacetamidopropane-1,3-diol used as a starting material and the ester products of the invention exist in structural or diastereoisomeric as well as optical isomeric form. The present invention is concerned with compounds having the "threo" diastereoisomeric as distinguished from the "erythro" diastereoisomeric form. The groups on the two asymmetric carbon atoms of such threo diastereoisomers have the same relative special configuration or arrangement as the groups on the two asymmetric carbon atoms of pseudo ephedrine and threose.

Because of the difficulty in representing these structural differences in graphic formulae, the customary structural formulae are used in both the specification and claims. However, unless otherwise indicated the formulae are to be interpreted in their generic sense, that is, as representing the "D-threo" and "L-threo" isomers in separated form as well as the racemic mixture thereof.

Examples of compounds falling within the present invention include, but are not limited to, the following:

D-threo-2,2-dichloro-N-[β-hydroxy-α-(hydroxymethyl)-p-nitrophenethyl]acetamide, α-(3-methyl-1-adamantaneacrylate)ester;
L-threo-2,2-dichloro-N-[β-hydroxy-α-(hydroxymethyl)-p-nitrophenethyl]acetamide, α-(3-fluoro-1-adamantanemethacrylate)ester;
D-threo-2,2-dichloro-N-[β-hydroxy-α-(hydroxymethyl)-p-nitrophenethyl]acetamide, α-(3-chloro-1-adamantanecarboxylate)ester;
L-threo-2,2-dichloro-N-[β-hydroxy-α-(hydroxymethyl)-p-nitrophenethyl]acetamide, α-(3-iodo-1-adamantanecarboxylate)ester;
L-threo-2,2-dichloro-N-[β-hydroxy-α-(hydroxymethyl)-p-nitrophenethyl]acetamide, α-(3-bromo-1-adamantanebutylate)ester;
D,L-threo-2,2-dichloro-N-[β-hydroxy-α-(hydroxymethyl)-p-nitrophenethyl]acetamide, α-(3-methoxy-1-adamantanecarboxylate)ester;
L-threo-2,2-dichloro-N-[β-hydroxy-α-(hydroxymethyl)-p-nitrophenethyl]acetamide, α-(3-phenyl-1-adamantanecarboxylate)ester;
D-threo-2,2-dichloro-N-[β-hydroxy-α-(hydroxymethyl-p-nitrophenethyl]acetamide, α-(3,5-dimethyl-1-adamantanecarboxylate)ester;
D,L-threo-2,2-dichloro-N-[β-hydroxy-α-(hydroxymethyl)-p-nitrophenethyl]acetamide, α-(2-adamantaneacetic acid)ester;
L-threo-2,2-dichloro-N-[β-hydroxy-α-hydroxy-(methyl)-p-nitrophenethyl]acetamide, (Δ²,α-2-adamantaneacetic acid)ester;
L-threo-2,2-dichloro-N-[β-hydroxy-α-hydroxy-(methyl)-p-nitrophenethyl]acetamide, α-(4-methyl-2-adamantaneacetic acid)ester;
D,L-threo-2,2-dichloro-N-[β-hydroxy-α-(hydroxymethyl)-p-nitrophenethyl]acetamide, α-(2-adamantanecarboxylate)ester.

The compounds of this invention can be prepared by reacting a 1-p-nitrophenyl-2-dichloroacetamidopropane-1,3-diol compound of the structure

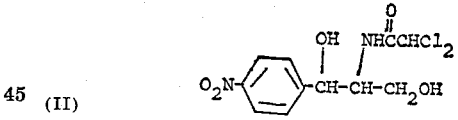

(II)

with an acyl halide of the structure III

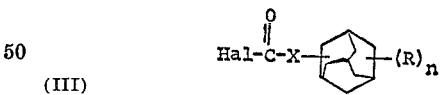

(III)

in a molar of II:III of within the range of from about 1.8:1 to about 1:1.

The reaction is carried out under anhydrous conditions in the presence of a basic catalyst such as pyridine, triethylamine, N,N-dimethylaniline or N-ethylpiperidine, at a temperature within the range of from about 20 to about 35°.

Alternatively, a solution of II and III in a hydrocarbon solvent like benzene is refluxed for 2–5 hr. without any basic catalyst.

Among the suitable acyl halide reactants may be mentioned the 1-adamantane acid halides such as 1-adamantanecarboxylic acid chloride, 3 - methyl - 1 - adamantanecarboxylic acid chloride, 3 - fluoro - 1 - adamantanecarboxylic acid chloride, 3 - chloro - 1 - admantaneacrylic acid bromide, 3-bromo - 1 - adamantanecarboxylic acid chloride, 3 - iodo - 1 - adamantanecarboxylic acid iodide, 3 - methoxy - 1 - adamantanepropionic acid chloride, 3-phenyl - 1 - adamantanecarboxylic acid chloride, 3,5 - dimethyl - 1 - adamantanebutyric acid chloride, 2- adamantanecarboxylic acid chloride, 1-adamantylacetyl chloride, 2 - (1 - adamantyl)propionyl chloride, Δ²,α-(adamantaneacetic acid chloride), 2 - adamantaneacetic acid chloride and 4 - methyl - 2 - adamantaneacetic acid chloride.

All of the acyl halides described hereinbefore may be prepared by heating an acid of the formula

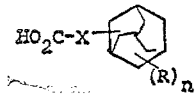

(IV)

wherein X and n are as hereinbefore defined, with two parts by weight of a thionyl halide, preferably thionyl chloride or thionyl bromide, alone, or in the presence of an anhydrous solvent, such as chloroform or benzene, under reflux for a period of up to three hours, concentrating to remove the excess thionyl halide (and any solvent present), and then distilling or recrystallizing to obtain the resultant acyl halide.

The above starting materials can be employed in the form of their corresponding salts as will be apparent to one skilled in the art.

The new compounds of Formula I are useful as antimicrobial agents and may be used to combat infections in animal species, such as mice, rats, dogs, pigs, guinea pigs, and the like, due to organisms such as *Trichomonas vaginalis, Trichomonas foetus, Staphyloccocus aureus, Salmonella schottmuelleri, Salmonella choleraesius, Klebsiella pneumoniae, Proteus vulgaris, Escherichia coli, C. albicans, Trichophyton mentagrophytes* or *Pasteurella multocida*. For example, a compound or mixture of compounds of Formula I may be administered orally to an infected animal, e.g., to a mouse, in an amount of about 5 to 250 mg. per kg. per day in 2 to 4 divided doses. These may be conventionally formulated in a tablet, capsule or elixir containing about 10 to 250 mg. per dosage unit, by compounding the active substance or substances with the conventional excipient, vehicle, binder, preservative, flavor, etc., as called for by accepted pharmaceutical practice. They may also be applied topically, e.g., to dermatophytosis in a guinea pig, in a lotion, salve or cream at a concentration of about 0.01 to 3 percent by weight. They may also be used in the prophylactic treatment of scours in small pigs.

They may also be used as surface disinfectants. About 0.01 to 1 percent by weight of any of these substances may be dispersed on an inert solid or in a liquid such as water and applied as a dust or spray. They may be incorporated also, for example, in a soap or other cleansing agent, e.g., a solid or liquid detergent, detergent composition, for example, in general cleaning, in cleaning dairy barns or equipment or cleaning food handling or processing equipment.

The following examples further illustrate the invention.

EXAMPLE 1

D-threo - 2,2 - dichloro-N-[β-hydroxy - α - (hydroxymethyl) - p - nitrophenethyl]acetamide, α - (1-admantanecarboxylate)ester To a solution of 4.0 g. of D-threo - 2,2 - dichloro-N-[β-hydroxy - α - (hydroxymethyl) - p - nitrophenethyl] acetamide in 50 ml. of pyridine, 2.5 g. of 1-adamantanecarboxylic acid chloride is added and the solution stirred for 72 hrs. The reaction mixture is poured onto ice water. The thick oil is separated and dissolved in 200 ml. of ether. The ethereal solution is washed successively with water, dilute $Na_2CO_3$ solution, water, dilute HCl and water. Evaporation of the dried ethereal solution gives a thick oil, which crystallizes on layering with pentane and scratching (4.2 g.). Recrystallization from ether-pentane gives an analytical sample, M.P. 76–79°, shrinks at 73°.

*Analysis.*—Calcd. for $C_{22}H_{26}N_2O_6Cl_2$ (percent): C, 54.48; H, 5.40; N, 5.78. Found (percent): C, 54.24; H, 5.50; N, 5.62.

EXAMPLE 2

L-threo - 2,2 - dichloro - N - [β-hydroxy - α - (hydroxymethyl) - p - nitrophenethyl]acetamide, α - (1-admantanecarboxylate)ester Following the procedure of Example 1, but substituting L-threo - 2,2 - dichloro-N-[β-hydroxy - α - (hydroxymethyl) - p - nitrophenethyl]acetamide for D-threo-2,2-dichloro - N - [β - hydroxy - α - (hydroxymethyl)-p-nitrophenethyl]acetamide, the title compound is obtained.

EXAMPLE 3

D.L-threo - 2,2 - dichloro - N - [β-hydroxy - α - (hydroxymethyl) - p - nitrophenethyl]acetamide, α - (1-admantanecarboxylate)ester Following the procedure of Example 1, but substituting D,L-threo - 2,2 - dichloro - N - [β-hydroxy - α - (hydroxymethyl) - p - nitrophenethyl]acetamide for D-threo-2,2-dichloro - N - [β - hydroxy - α - (hydroxymethyl) - p-nitrophenethyl]acetamide, the title compound is obtained.

EXAMPLE 4

D-threo - 2,2 - dichloro - N - [β-hydroxy - α - (hydroxymethyl) - p - nitrophenethyl]acetamide,α-(2-adamantanecarboxylate)ester Following the procedure of Example 1, but substituting 2-adamantanecarboxylic acid chloride for 1-adamantanecarboxylic acid chloride, the title compound is obtained.

EXAMPLE 5

D-threo - 2,2 - dichloro - N - [β-hydroxy - α - hydroxymethyl) - p - nitrophenethyl]acetamide, α - (1-admantaneacrylate)ester (A) 1-adamantanemethanol: To a well-stirred suspension of 15 g. of lithium aluminum hydride in 500 ml. of dry ether, a solution of 54.0 g. (0.3 mole) of 1-adamantanecarboxylic acid in 500 ml. of dry ether is added at such a rate as to maintain gentle reflux (addition time 2.5 hrs.). The mixture is stirred overnight at room temperature. After cooling, 75 ml. of distilled water is added cautiously followed by 300 ml. of 5 N $H_2SO_4$ and 500 ml. of ether. The ethereal layer is separated, and the aqueous layer is extracted once with 300 ml. of ether. The ether layers are combined, washed with water, saturated sodium bicarbonate solution, and again with water and dried over anhydrous $MgSO_4$. Evaporation of ether gives 46.9 g. (95%) of 1-adamantanemethanol as white crystals, M.P. 114–115°;

$\lambda_{max.}^{Nujol}$ 3.05μ (OH), 9.5μ (C—O)

(B) 1-adamantaldehyde: 1-adamantanemethanol 33.2 g. (0.2 mole), is dissolved in 700 ml. of reagent grade acetone and cooled to 0— (—5°). Freshly made 8 N Jones Reagent (60 ml.) is added dropwise with stirring at such a rate as to maintain the temperature of mixture at 8–10° (addition time 40 min.). After the addition, the cooling bath is removed and the mixture stirred for 10 min. Methanol (50 ml.) is added to the bluish green solution. The separated solids are dissolved by the addition of 700 ml. of water and stirring. The solvent is removed in vacuo, and the aqueous layer is extracted with 3 × 50 ml. of ether. The combined ethereal extract is washed once with water, twice with sat. solution of $NaHCO_3$ (150 ml.), once again with water. After drying the solution is concd. in vacuo to give 24.8 g. (76%) of crude 1-adamantaldehyde as a thick oil.

(c. 1-adamantaneacrylic acid ethyl ester: Triethylphosphonoacetate (44.8 g., 0.2 mole) is added dropwise at 20° to a slurry of sodium hydride (9.6 g.) in 500 ml. of dry dimethoxyethane (addition time 1.5 hrs.). The mixture is stirred for 2 hr. at room temperature. 1-adamantaldehyde (24.6 g., 0.15 mole) dissolved in 200 ml. of dry dimethoxyethane, is added dropwise at room temperature to the above reaction mixture, and stirred overnight. The mixture is then refluxed for an hour. After removing the solvent in vacuo, the mixture is diluted with 1000 ml. of water and extracted with 5× 300 ml. of ether. The ethereal layers are combined, dried (MgSO$_4$) and concd. to give 28.4 g. (81%) of the title compound as a clear yellow liquid, $\lambda_{max}$. 5.8µ (ester C=O), 6.08µ (conj. alkene).

(D) 1-adamantaneacrylic acid: A stirred mixture of 23.4 g. (0.1 mole) of the product from step (C), 250 ml. of 25% KOH solution, and 100 ml. of ethyl alcohol is refluxed for 3 hrs. The reaction mixture is cooled, concd. in vacuo, and diluted with 250 ml. of water. The postassium salt of the acid that precipitates is collected (16.4 g.), dissolved in 100 ml. of alcohol, cooled, and acidified with dil. HCl. The crude solid obtained after removal of the solvent is crystallized from methanol-water to give 8.3 g. (40%) of the title compound as pale yellow crystals, M.P. 170–172°, shrinking several degrees before melting.

$\lambda_{max}^{Nujol}$ 3.7–3.9µ (OH), 5.80µ (C=O), 6.10 (C=C)

*Analysis.*—Calcd. for $C_{13}H_{18}O_2$ (percent): C, 75.69; H, 8.80. Found (percent): C, 75.85; H, 8.50. Neutralization equivalent: Calcd., 206.27. Found, 207.8.

(E) 1-adamantaneacrylic acid chloride: A mixture of 10 g. of 1-adamantaneacrylic acid and 20 ml. of thionyl chloride is heated under reflux for 30 min. The excess thionyl chloride is removed in vacuo. Ten ml. of anhydrous benzene is added to the residue and the solvent is removed by distillation in vacuo. The residue crystallizes to a solid mass and is used without further purification.

(F) D - threo-2,2-dichloro-N-[β-hydroxy-α-(hydroxy-α-(hydroxymethyl) - p - nitrophenethyl]acetamide,α-(1-adamantaneacrylat) ester: Following the procedure of Example 1, but substituting 1-adamantaneacrylic acid chloride for 1-adamantanecarboxylic acid chloride the title compound is obtained.

EXAMPLE 6

D - threo - 2,2 - dichloro - N - [β - hydroxy - α - (hydroxymethyl) - p - nitrophenethyl]acetamide,α - (Δ$^2$,α-adamantane-acetic acid)ester (A) 2-adamantanone: A mixture of 100 ml. of conc. H$_2$SO$_4$ and 24.6 g. (0.16 mole) of 1-hydroxyadamantane is heated with stirring on the steam bath for 4.5 hrs. At the end of the period, the dark red solution is poured onto crushed ice, and the mixture is extracted with 300 ml. of ether. After washing the ether layer to neutrality, it is dried (MgSO$_4$). Evaporation of the ether gives 15.0 g. (62%) of 2-adamantanone as a white solid which is further purified by steam distillation followed by crystallization from cyclohexane; M.P. 260–265°.

(B) Δ$^2$,α-adamantaneacetic acid, ethyl ester: To a well-stirred suspension of 2.8 g. of sodium hydride dispersed in 75 ml. of dry 1,2-dimethoxyethane, 13.45 g. (0.06 mole) of triethylphosphonoacetate are added dropwise at 20° (addition time 1 hr.). After the addition, the mixture is stirred for an hour at room temperature. To the resulting yellow solution, a solution of 9.0 g. (0.06 mole) of 2-adamantanone in 75 ml. of dry 1,2-dimethoxyethane is added at such a rate as to maintain the temperature between 28–30°. The mixture is then stirred overnight at room temperature. The mixture is concentrated, diluted with 100 ml. of water, and extracted with 3× 300 ml. of ether. After drying (MgSO$_4$), the ether is removed in vacuo to give 10.3 g. (77%) of Δ$^2$,α-adamantaneacetic acid, ethyl ester, as a thick oil which is used as such for the next step.

(C) Δ$^2$,α-adamantaneacetic acid: To a solution of 10.3 g. of the product of part (B) in 250 ml. of ethyl alcohol, 150 ml. of an aqueous KOH solution (25%) is added and the mixture heated under reflux for 4 hrs. The mixture is concentrated in vacuo, diluted with water and extracted with water and extracted with chloroform (200 ml.) to remove the insoluble impurities. The basic solution is cooled, acidified with 5 N HCl, and the solid which separates is extracted with chloroform (3× 250 ml.). The chloroform solution is washed with water, dried (MgSO$_4$) and evaporated in vacuo to give 6.8 g. (79%) of Δ$^2$,α-adamantaneacetic acid (yellowish needles); M.P. 136–138°.

(D) Δ$^2$,α-adamantaneacetic acid chloride: To a solution of 3 ml. of oxalyl chloride in 25 ml. of dry benzene, a solution of 0.06 g. (0.005 mole) of the product of part (C), in 25 ml. of dry benzene is added. After the initial evolution of gas has subsided, the reaction mixture is stirred and heated to reflux for an hour. The solvent is removed in vacuo, 25 ml. of dry ether is added to the residue, and the solvent is evaporated to give a thick oil which solidifies to a semi-solid.

(E) D - threo - 2,2 - dichloro - N - [β - hydroxy - α- (hydroxymethyl) - p - nitrophenethyl]acetamide,α-(Δ$^2$,α-adamantaneacetic acid)ester: Following the procedure of Example 1, but substituting Δ$^2$,α-adamantaneacetic acid chloride for 1-adamantanecarboxylic acid chloride the title compound is obtained.

EXAMPLE 7

D-threo-2,2-dichloro-N-[β - hydroxy-α-(hydroxymethyl)-p - nitrophenethyl]acetamide,α-(2 - adamantaneacetic acid)ester (A) Δ$^2$,α-adamantaneacetonitrile: To a well-stirred suspension of 14.5 g. (0.6 mole) of 50% sodium hydride in 300 ml. of dry 1,2-dimethoxyethane, 53 g. (0.3 mole) of diethylcyanomethylphosphonate is added dropwise at 20°. After the addition, the mixture is stirred at room temperature for 2 hrs. To the resulting yellow solution, a solution of 30 g. (0.2 mole) of adamantanone in 300 ml. of dry 1,2-dimethoxyethane is added during 0.25 hr. The temperature of the reaction mixture rises to 45°. The reaction mixture is refluxed with stirring for 1.5 hrs. The mixture is cooled, concentrated, diluted with water and extracted with ether. After drying (MgSO$_4$), the ether is removed in vacuo to give 39.6 g. of Δ$^2$,α-adamantaneacetonitrile; M.P. 64.69°;

$\lambda_{max}^{Nujol}$ 4.5µ (C≡N), 6.15 (conjugated C=C)

τ CDCl$_3$, 5.0 (vinyl proton).

*Analysis.*—Calcd. for $C_{12}H_{15}N$ (percent): C, 83.19; H, 8.73; N, 8.09. Found (percent): C, 83.07; H, 8.72; N, 7.87.

(B) 2-adamantaneacetonitrile: A solution of 15.0 g. of Δ$^2$,α-adamantaneacetonitrile in 200 ml. of 95% alcohol is hydrogenated over 2.0 g. of 5% palladium on carbon. The catalyst is filtered off, and the solvent removed in vacuo to give 13.09 g. (86%) of 2-adamantaneacetonitrile, M.P. 37–39°. An analytical sample crystallized from pentane melts at 42–43°;

$\lambda_{max}^{Nujol}$ 4.5µ (C≡N), no conjugated C=C at 6.15µ;

τ CDCl$_3$ none at 5.0 (absence of vinyl protons).

*Analysis.*—Calcd. for $C_{12}H_{17}N$ (percent): C, 82.22; H, 9.78; N, 7.99. Found (percent): C, 81.97; H, 9.64; N, 7.71.

(C) 2-adamantaneacetic acid: A solution of 6.5 g. of 2-adamantaneacetonitrile and 9 g. of sodium hydroxide in 50 ml. of alcohol is refluxed overnight. The solution is concentrated in vacuo, diluted with water and extracted with CHCl$_3$. The aqueous layer is cooled, acidified, and extracted with chloroform. Evaporation of chloroform gives 5.19 g. of 2-adamantaneacetic acid, M.P. 118–120°.

(D) 2-adamantaneacetic acid chloride: A mixture of 10 g. of 2-adamantaneacetic acid and 20 ml. of thionyl chloride is heated under reflux for 30 min. The excess of thionyl chloride is removed in vacuo, 10 ml. of dry benzene is added to the residue and solvent removed in vacuo. The residue crystallizes and is used without further purification.

(E) D-threo - 2,2 - dichloro-N-[β-hydroxy-α-(hydroxymethyl)-p-nitrophenethyl]acetamide,α - (2 - adamantaneacetic acid)ester: Following the procedure of Example 1, but substituting 2-adamantaneacetic acid chloride for 1-adamantanecarboxylic acid chloride the title compound is obtained.

EXAMPLES 8 TO 12

Similarly employing the procedure of Example 1, but substituting the following R-substituted-adamantanecarboxylic acid halide for 1-adamantanecarboxylic acid chloride the corresponding esters are obtained.

Example 8: 3-methyl-1-adamantanemethacrylic acid chloride
Example 9: 3-chloro-1-adamantanebutyric acid bromide
Example 10: 3-methoxy-1-adamantanecrotonic acid iodide
Example 11: 3-phenyl-1-adamantanevaleric acid chloride
Example 12: 3,5-dimethyl-1-adamantanecarboxylic acid chloride

What is claimed is:

1. A compound of the structure

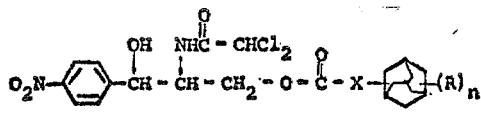

wherein X is a single bond or alkylene or alkenylene, containing 1 to 6 carbons, and is attached at the 1- or 2-position of the adamantane ring, R is selected from the group consisting of halogen, lower alkyl, lower alkoxy or phenyl, n is 0, 1 or 2, where X is attached at the 1-position of the adamantane, R can be attached at the 3- and/or 5-position thereof, where X is attached at the 2-position of the adamantane ring, n is 0 or 1 and R is attached at the 4- or 6-position thereof.

2. A compound in accordance with claim 1 having the structure

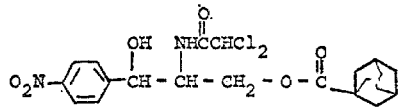

including D-threo, L-threo and DL threo isomers.

3. A compound in accordance with claim 1 having the structure

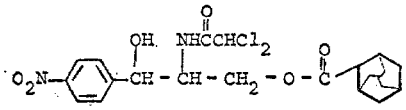

including all threo isomers thereof.

4. A compound in accordance with claim 1 having the structure

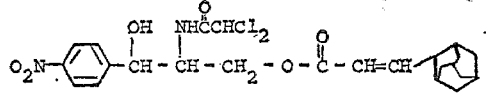

including all threo isomers thereof.

5. A compound in accordance with claim 1 having the structure

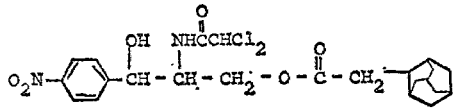

including all threo isomers thereof.

6. A compound in accordance with claim 1, having the structure

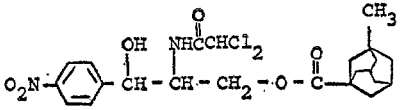

and its threo isomers.

7. A compound in accordance with claim 1, having the structure

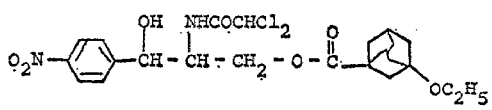

and its threo isomers.

8. A compound in accordance with claim 1, having the structure

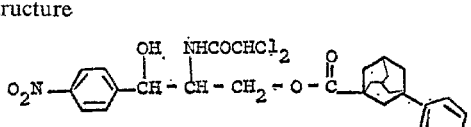

and its threo isomers.

9. A compound in accordance with claim 1, having the structure

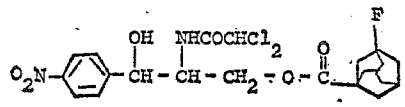

and its threo isomers.

References Cited
UNITED STATES PATENTS
2,662,906   3/1951   Edgerton _____ 260—404
FOREIGN PATENTS
672,672   3/1966   Belgium _____ 260—477
OTHER REFERENCES
Fort, Jr., et al., Chem. Rev., 64, pp. 297–8 (1964).

LORRAINE A. WEINBERGER, Primary Examiner
R. GERSTL, Assistant Examiner

U.S. Cl. X.R.

260—469, 514G, 515R, 562C; 424—299